United States Patent

Land et al.

[15] 3,651,252

[45] Mar. 21, 1972

[54] IMAGE REPRODUCTION SYSTEM WHICH DETECTS SUBJECT BY SENSING INTENSITY RATIOS

[72] Inventors: Edwin Land, Cambridge, Mass.; Leonard A. Ferrari, San Dimas, Calif.; Sholly Kagan, Natick; John J. McCann, Belmont, both of Mass.

[73] Assignee: Polaroid Corporation, Cambridge, Mass.

[22] Filed: Jan. 22, 1970

[21] Appl. No.: 4,895

[52] U.S. Cl. ....178/6, 250/205, 250/209, 250/220 MX, 356/206, 356/229

[51] Int. Cl. ....H04n 5/30, H01j 39/12

[58] Field of Search ....250/205, 209, 220 MX; 356/195, 356/205, 206, 179, 222, 223, 229, 230; 178/6, DIG. 16

[56] References Cited

UNITED STATES PATENTS

| | | | |
|---|---|---|---|
| 1,859,824 | 5/1932 | Godefroy | 250/220 M X |
| 2,934,653 | 4/1960 | Hulst | 250/205 |
| 3,520,624 | 7/1970 | Johnson | 356/206 |
| 3,536,831 | 10/1970 | Kanemaki | 178/6 |

FOREIGN PATENTS OR APPLICATIONS

| | | | |
|---|---|---|---|
| 683,605 | 12/1952 | Great Britain | 178/DIG. 16 |

*Primary Examiner*—Robert L. Griffin
*Assistant Examiner*—Joseph A. Orsino, Jr.
*Attorney*—Brown and Mikulka and William D. Roberson

[57] ABSTRACT

This specification discloses an image reproduction system in which an array of photocells is employed to sense intensity ratios in the subject image focused in the array. An analog circuit responsive to the signals developed by the photocells produces logarithmic output signals representing the lightness of discrete areas in an image focused on the photocell array. The output signals of the analog system energize lamps of a lamp array to reproduce the subject image.

19 Claims, 4 Drawing Figures

INVENTORS
EDWIN H. LAND,
LEONARD A. FERRARI,
SHOLLY KAGAN &
JOHN J. McCANN

BY Brown & Mikulka &
Richard L. Aitken
ATTORNEYS

INVENTORS
EDWIN H. LAND
LEONARD A. FERRARI
SHOLLY KAGAN &
JOHN J McCANN

BY Brown + Mikulka &
Richard L. Aitken
ATTORNEYS

INVENTORS
EDWIN H. LAND,
LEONARD A. FERRARI,
SHOLLY KAGAN &
JOHN J. McCANN

BY Brown & Mikulka &
Richard L. Aitken
ATTORNEYS

IMAGE REPRODUCTION SYSTEM WHICH DETECTS SUBJECT BY SENSING INTENSITY RATIOS

BACKGROUND OF THE INVENTION

This invention relates to image reproduction systems, and more particularly, to an image reproduction system in which an image of a scene is reproduced by detecting ratios of brightness or intensity in the scene.

In a conventional image reproduction system such as a television system, the subject image is reproduced by sensing incremental areas of brightness of the subject image and then controlling the brightness of incremental areas in the reproduced image so that they correspond to the brightness of the corresponding incremental areas in the subject image. For example, in a conventional television system, the scene to be televised is scanned continuously to produce a video signal which represents a continuous record of the absolute brightness of each successive increment of the scanned image. However, it can be demonstrated that the brightness of a discrete area of a subject does not by itself determine how light or dark that discrete area of the image is perceived. For example, if a white cat and a black cat are placed together in the same scene with the black cat in bright sunlight and the white cat in deep shade, photoelectric measurements may indicate that more light comes to the viewer from the black cat than from the white cat, yet the black cat is perceived by the viewer as black and the white cat is perceived as white. Also, if a plain white surface illuminated from one end by means of a source of light positioned near the surface so that a brightness gradient across the surface results, photoelectric measurements may indicate that 10 times as much light is received from the end of the surface near the light surface as from the opposite end of the surface, yet the entire surface is perceived as uniformly white. These experiments demonstrate that the lightnesses or darknesses of different parts of a subject are not perceived by the viewer in accordance with the brightness of the different parts of the subject. Yet, all conventional image reproduction systems control the brightness of the discrete parts of the reproduced image in accordance with the brightness of the corresponding parts of the subject image.

The phenomenon of perception demonstrated by the above described experiments can be further examined with reference to FIG. 1, which illustrates an experiment employing a geometric pattern of panels 11 through 16. Each of the panels 11 through 16 is a different shade of grey and thus has a different reflectance. The pattern may be constructed by cutting the panels out of paper and pasting them onto a common background. Each panel is uniform in reflectance over its entire surface. The reflectances of the panels are indicated in the following table:

| Panel | Reflectance |
|---|---|
| 11 | 75 |
| 12 | 43 |
| 13 | 55 |
| 14 | 21 |
| 15 | 58 |
| 16 | 12 |

If the pattern is illuminated from the lower edge, such as by a light source 19, the panels near the light source are more strongly illuminated. Moreover, the edge of each panel near the light source 19 reflects more light than the opposite edge of such panel. Nevertheless, the viewer perceives each panel as having a uniform lightness or darkness and the perceived lightness or darkness corresponds to the relative reflectance of the panel. Thus, the panel 16 is perceived as being much darker than the panel 11 even though the same amount of light may be reflected from each of these panels to the viewer. To facilitate the description of this phenomenon, hereinafter the relative position of a panel or a discrete area of an image in a range running from white to black through all shades of grey, shall be referred to as the lightness of the panel or discrete area.

Although the amount of light with which the pattern in FIG. 1 is illuminated by the source 19 diminishes from the bottom of the pattern at panel 16 up to the top of the pattern at panel 11, the edges of each adjacent pair of panels on opposite sides of the boundary between such pair is illuminated with substantially the same intensity. Accordingly, if the ratio of the intensities of the light reflected from the adjacent edges of each adjacent pair of panels is photometrically measured, the ratio obtained is the same as the ratio of the reflectances of the panels. For example, the intensity of the light reflected from the edge of the panel 11 adjacent the panel 12 could be about 140 units in the example with the pattern illuminated with the light source from the lower edge (since only ratios are being considered, the form of the units is not significant). The intensity of the light reflected from the edge of the panel 12 adjacent the panel 11 would then be about 80 units. Thus, the ratio of the intensities on opposite sides of the boundary between the panels 11 and 12 is 140/80, which is about equal to the ratio 75/43, the ratio of the reflectances of the panels 11 and 12. The intensity of the light reflected from the edge of the panel 12 adjacent to the panel 13 could be about 118 units compared with the 80 units reflected from the edge adjacent the panel 11. The edge of the panel 13 adjacent the panel 12 would then reflect light having an intensity of 150 units. Thus, the ratio of the reflected light intensities at the boundary between the panels 12 and 13 is 118/150, which is about equal to 43/55, the ratio of the reflectances of the panels 12 and 13. The intensity reflected from the edge of panel 13 adjacent the panel 14 could be about 215 units compared with 82 units reflected from the edge of the panel 14 at this boundary. The ratio of these intensities is about equal to the ratio of the corresponding reflectances of these panels, 55/21. The intensities reflected at the boundary between the panels 14 and 15 could be about 145 and 400 and the intensities reflected at the boundary between the panels 15 and 16 could be about 510 and 104. The ratios of these intensities are about equal to the corresponding ratios of reflectances 21/58 and 58/12.

Since the lightness of the panels would be perceived by a viewer in accordance with their reflectance even though the intensities of the light reflected from the different panels are not in proportion to these reflectances and since the ratios of the intensities across the boundaries between the panels correspond to the ratios of the reflectances of the panels, it can be postulated that the brightness of each panel is perceived in accordance with the ratio of intensities across the boundaries between the panels. Similarly, it can be postulated that the lightnesses of discrete areas of a scene are perceived in accordance with the ratios of intensities across the boundaries between the discrete areas. The present invention is based on this phenomenon of perception.

The ratio of the reflectance of the panel 11 to that of the panel 12 is 75/43. If this ratio is multiplied by the ratio of the reflectance of the panel 12 to that of the panel 13, the following ratio results $(75/43) \times (43/55) = 75/55$, which is the ratio of the reflectance of the panel 11 to that of the panel 13. Similarly, if this latter ratio is multiplied times the ratio of the reflectance of the panel 13 to that of the panel 14, the following ratio results $(75/55) \times (55/21) = 75/21$, which is the ratio of the reflectance of the panel 11 to that of the panel 14. Likewise, if the ratio 75/21 is multiplied by the ratio of the reflectance of the panel 14 to that of the panel 15, then the ratio of the reflectance of the panel 11 to that of the panel 15 results, and if this last ratio is multiplied by the ratio of the reflectance of the panel 15 to that of the panel 16, then the ratio of the reflectance of the panel 11 to that of the panel 16, $75/12 = 6.3$, results.

Since the ratios of the intensities at the boundaries between the panels are about the same as the ratios of the reflectances even though the pattern is illuminated from one edge or by the source 19, these ratios can be multiplied together in the same manner as the ratios of reflectances to give the same result. Thus, the ratio of the intensities at the boundary between the panels 11 and 12 indicates the ratio of the reflectance of the panel 11 to that of the panel 12. If the ratio of intensities at the boundary between the panels 12 and 13 is multiplied by the ratio of the intensities at the boundary between the panels 11 and 12, the resulting product equals the ratio of the reflectance of the panel 11 to that of the panel 13. Similarly, by multiplying the ratios of intensities at the boundaries between each succeeding pair of panels going toward the panel 16 times all the preceding ratios of intensities, the ratio of the reflectance of the panel 11 to each of the succeeding panels is obtained. Since each ratio is multiplied times a sequence of preceding ratios, each resulting product is referred to as a sequential product. When all of the intensity ratios of the boundaries are multiplied together, the result is 6.3 which is the ratio of the reflectance of the panel 11 to that of the panel 16. Thus, by measuring the ratios of light intensities at the boundaries between the panels, the relative reflectance of the panels can be determined even though the pattern is not uniformly illuminated but is illuminated from the edge by the source 19.

As pointed out above, the lightness of each panel is perceived by the viewer as uniform even though the light reflected from each panel has an intensity gradient across the panel because the intensities of light reflected from the opposite edges of the panel are substantially different. Moreover, each panel is ascribed a lightness by the viewer in accordance with its relative reflectance. Since the ratios of intensities across the boundaries between the panels are equal to corresponding ratios of reflectances, the multiples of the ratios of intensities across the boundaries directly correspond to the relative lightness of each panel as perceived by a viewer. Thus, an image of the pattern in FIG. 1 can be produced by sensing the ratios of the light intensities across the boundaries between the panels, multiplying these ratios together in succession to obtain products representing the relative lightness of each panel as perceived by a viewer and then controlling the brightness of the panels in the reproduced image in accordance with the products obtained by multiplying the ratios of intensities. The resulting image accurately represents the pattern as perceived by the viewer even though the pattern is illuminated from one edge because, as pointed out above, the viewer perceives the lightness of each panel in accordance with its reflectance rather than according to the intensity of light reflected from each panel. The fact that the panels in the reproduced image are each uniform in brightness whereas the panel in the subject pattern has a brightness gradient across them, does not prevent the images from being an accurate representation of the subject image because the viewer scarcely perceives these gradients but perceives each of the panels as being of a uniform lightness. Thus, there is no necessity for reproducing the brightness gradient across each of the panels.

As has been explained in the experiment with the pattern of FIG. 1 illuminated from one edge, a viewer perceives the lightness of each panel in accordance with its relative reflectance. This phenomenon does not mean that the viewer always perceives the lightness of discrete areas in accordance with the relative reflectance of the discrete areas. Discrete areas of different lightness can be formed by shadows on a background of uniform reflectance. Nevertheless, multiples of the ratio of intensities across the boundaries between the discrete areas computed as described above with reference to FIG. 1, correspond to the relative lightness of the discrete areas.

A copending application Ser. No. 699,496 filed Jan. 22, 1968 entitled "Method and System for Image Reproduction Based on Significant Visual Boundaries of Original Subject," invented by Edwin H. Land and John J. McCann, and assigned to the assignee of the present application, now Pat. No. 3,553,360 discloses a system which like the present invention is based on the above-discussed phenomenon of visual perception. In the systems disclosed in the said copending application, the subject is scanned point-by-point to produce a time-coded video signal. The video signal is operated on to provide signals representing the ratio of brightness across the boundaries of discrete areas in the televised subject. These signals are transmitted to the receiver where the signals representing the ratios are multiplied together to provide signals representing the relative lightness of the discrete areas of the televised subject as perceived by a viewer of the televised subject. The image is then produced in accordance with these lightness signals.

SUMMARY OF THE INVENTION

In the system of the present invention, the subject to be reproduced is not scanned. Instead, an array of photocells is provided to sense each incremental area of an image of the subject. Pairs of photocells separated by small incremental distances are interconnected to produce output signals representing the ratios of the light intensities sensed by the photocell pairs. The output signal from each succeeding pair of photocells is multiplied by the signals of all preceding pairs of photocells in the array to provide signals which represent the lightnesses of the discrete areas in the subject as they would be perceived by a viewer. These lightness signals are then used to control the brightness of corresponding incremental areas in the reproduced image. In this manner, an image is reproduced in which the brightness of each discrete area is controlled in accordance with the lightness of the corresponding discrete area of the original subject as perceived by a viewer of the subject.

DESCRIPTION OF THE PREFERRED EMBODIMENT

Figure 2:
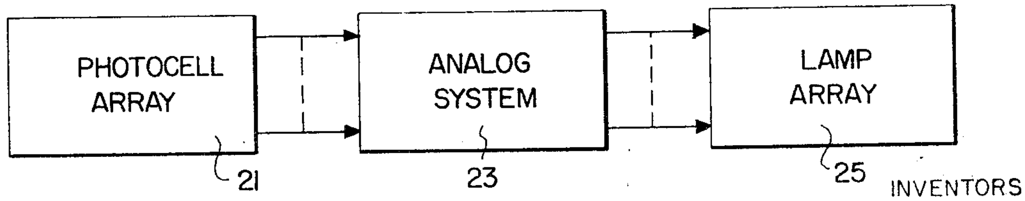
FIG. 2 is a block diagram illustrating the system of the present invention.

As shown in FIG. 2, the system of the present invention comprises an array of photocells 21 arranged in pairs. An image of the subject to be televised is focused on the photocell array. The image focused on the array of photocells may be considered to be divided into incremental areas, hereinafter called increments, each focused on a different photocell in the array. Each photocell of the array produces an output signal representing the intensity of the light received thereby. The output signals from the photocells are applied to an analog system 23 in which they are combined in a way to produce an output lightness signal for an adjacent pair of photocells, representing the relative lightnesses of the discrete areas of the image focused on such pair of photocells. The output signals of the analog system 23 are each applied to a different lamp of a lamp array 25, which lamp generates light of an intensity appropriate to characterize the lightness represented by the applied signal. Accordingly, each lamp in the lamp array generates light with an intensity or brightness in accordance with the lightness of the discrete area focused on a corresponding photocell. The lamps of the array 25 are located in positions corresponding to positions of the corresponding photocells in the photocell array so that the lamps reproduce the image focused on the photocell array. Because of the manner in which the image is reproduced by the lamp array, the lightnesses of discrete areas of the subject image focused on the photocell array 21 are reproduced as brightnesses in the image produced by the lamp array 25.

Figure 3:
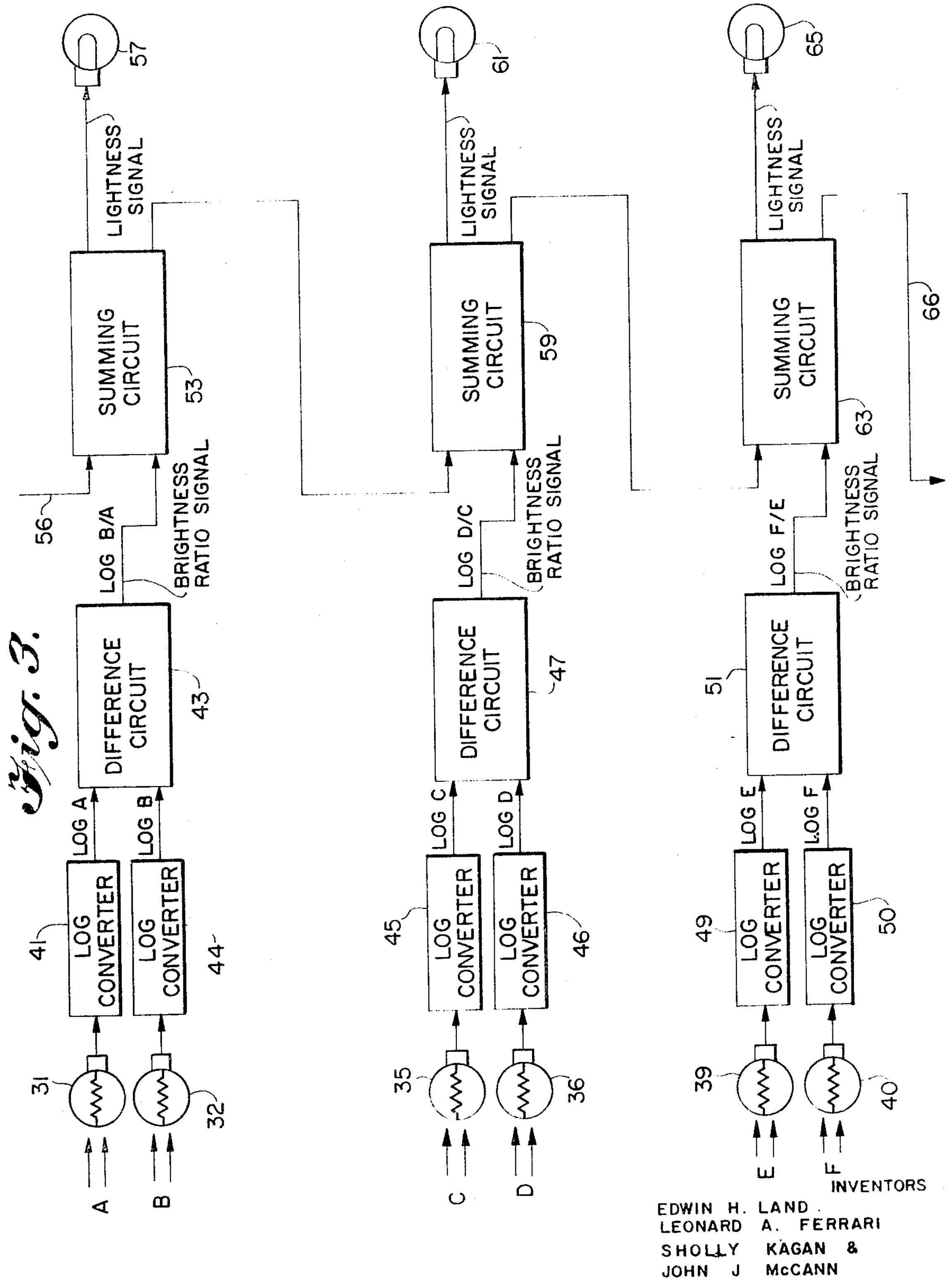
FIG. 3 is a block diagram illustrating in more detail a portion of the system of the present invention.

FIG. 3, which is a more detailed block diagram of a portion of the system of the present invention, illustrates how the analog circuit produces output signals corresponding to the logarithm of the relative lightness of the discrete areas of the image focused on the array of photocells. Only three pairs of the photocells of the array 21 are shown in FIG. 3, the photocells of one pair being designated by the reference numbers 31 and 32, the photocells of a second pair being designated by the reference numbers 35 and 36, and the photocells of a third pair being designated by the reference numbers 39 and 40. The photocells of each pair in the array are positioned so that they sense the light intensity of closely adjacent increments of the image focused thereon. Thus, the output signal of the photocell 31 is proportional to the intensity of light from one image increment focused on the photocell pair 31–32 and the output signal of the photocell 32 is proportional to the intensity of the light from an adjacent image increment. The output signal of the photocell 31 is converted to a logarithmic scale by a converter 41 and applied to the minus input of a difference circuit 43; and the output signal of the diode 32 is converted to a logarithmic scale by a converter 44 applied to the plus input of the difference circuit 43. The difference circuit 43 subtracts the signal applied to the minus input from that applied to the plus input and produces an output signal proportional to the difference between the two applied signals. If the intensity sensed by the photocell 31 is considered to be A and the intensity sensed by the photocell 32 is considered to be B, the output of the converter 41 represents log A and the output of the converter 44 represents log B. Accordingly, the output signal of the difference circuit 43 is a ratio signal which represents log B − log A, or log B/A. The brightness ratio signal representing log B/A signifies only how much brighter or darker image increment B is as compared to image increment A. It is to be noted that this signal does not carry dimensional information about the absolute intensities of light either from increment A or from increment B.

The brightness ratio signal has another interesting characteristic. Because it is derived from a pair of photocells spaced apart by a very small physical distance, illumination gradients across the original image do not significantly affect the amplitude of this signal. For example, with an image of the type shown in FIG. 1 focused on the photocell array, illumination gradients have a vanishingly small effect on the brightness ratio signal from any given photocell pair in the array. This will be true even though the absolute intensity of illumination in any large image area may vary greatly over the total extent of that area. Consequently, with such an image, the ratio of the responses of any two paired photocells, such as 31 and 32, is proportional to the ratio of reflectances of the incremental image areas sensed by the photocells. This proportionality is inherent in the brightness ratio signal derived from the photocell pair.

The photocells 35 and 36 sense the light from successive portions of the original subject. The photocells are preferably arranged so that the photocells 32 and 35 sense light from the same, or approximately the same, increment. Photocell 35 senses light of intensity C and photocell 36, sensing the intensity of light from the next adjacent image increment focused on the array senses light of intensity C. The output signals of the photocells 35 and 36 are applied to converters 45 and 46, which convert the applied signals to a logarithmic scale and apply them to a difference circuit 47. The difference circuit 47 subtracts the output signal of the converter 45 from the output signal of the converter 46 to produce a brightness ratio signal representing log D/C.

The photocells 39 and 40 sense light from still further portions of the subject adjacent to those sensed by the photocell pair 35–36. Again, it is preferable that photocells 36 and 39 sense light from the same or approximately the same increment. If photocell 39 senses light of intensity E and photocell 40 senses light with intensity F, the output signals of the photocells 39 and 40 are converted to a logarithmic scale by converters 49 and 50 and are then subtracted by means of a difference circuit 51 to produce a ratio signal representing log F/E.

The ratio signals derived from each photocell pair are further processed to obtain lightness signals representing for any one photocell pair in the array, the sequential multiplication of the corresponding brightness ratio from that one pair and the brightness ratios obtained from photocell pairs preceding the one pair in the sequence of the array. In this way, a signal is obtained for each image increment representing the lightness of that increment relative to all other image increments to which the photocell array is exposed. This is accomplished in the example illustrated by the use of summing circuits.

The output signal of the difference circuit 43 is applied to a corresponding summing circuit 53 which also receives a signal on a channel 56. The summing circuit 53 adds the two applied signals together to produce a lightness signal representing the sum of the two applied signals. The output of the summing circuit 53 is the output of the analog system 23 corresponding to the photocell pair 31–32. The output signal from the summing circuit 53 is applied to a lamp 57, which is located in a position in the lamp array 25 corresponding to the position of the photocell 32 in the photocell array.

The output signal from the difference circuit 47 is also applied to a corresponding summing circuit 59, which is also connected to receive an output signal from the summing circuit 53. The summing circuit 59 adds the two signals together to produce an output lightness ratio signal representing the logarithm of the multiple of the two applied signals. The output of the summing circuit 59 is the lightness signal output of the analog system corresponding to the photocell pair 35–36. The output signal of the summing circuit 59 is applied to a lamp 61, which is located in the lamp array 25 in a position corresponding to the position of the photocell 36 in the photocell array.

The output of the difference circuit 51 is similarly applied to a corresponding summing circuit 63, which is connected to receive an output signal from the summing circuit 59. The summing circuit 63 adds the two signals applied thereto together to produce an output signal representing the sum of the two applied signals. The output signal of the summing circuit 63 is the lightness signal output of the analog system 23 corresponding to the photocell pair 39–40 and is applied to a lamp 65 located in the lamp array 25 in a position corresponding to the position of photocell 40 in the photocell array.

Each pair of photocells in the entire photocell array is connected to a corresponding difference circuit to produce a ratio signal representing the logarithm of the ratio of the intensities sensed by the pair of photocells in the same manner that the photocell pairs are shown connected in FIG. 3. To obtain the sequential multiplication of such ratio signals, the ratio signal from each difference circuit is applied to a corresponding summing circuit in which the ratio signal is added to an output signal from the summing circuit corresponding to the preceding pair of photocells, just as the output signals of the difference circuits 47 and 51 are applied to the summing circuits 59 and 63 and are added to the output signals from the summing circuits corresponding to the preceding pairs of photocells. Accordingly, the signal applied to the summing circuit 53 over channel 56 is from the summing circuit corresponding to the photocell pair immediately preceding the photocell pair 31–32 in the sequence of the array. The increments of the image focused on this preceding pair are preferably immediately adjacent to the increments focused on the photocell pair 31–32. Similarly, an output signal of the summing circuit 63 is applied over a channel 66 to the summing circuit corresponding to the next succeeding pair of photocells in the array. The increments of the image focused on this next succeeding pair are adjacent to the increments focused on the photocell pair 39–40. The image increments focused on each succeeding photocell pair are adjacent to the image increments focused on the preceding photocell pair.

The photocells are arranged in a regular sequence and are preferably connected to the analog circuit in an endless loop so that an output signal of the summing circuit corresponding to what may be considered the last photocell pair of the array is connected to an input of the summing circuit corresponding to what may be considered the first photocell pair of the array. The photocell pairs are preferably arranged so that the increments focused on the last pair are adjacent to the increments focused on the first pair.

The spacing between photocells is small enough so that the photocells of a given pair sense substantially the same intensity unless an image boundary between discrete areas of different brightness in the image is focused to fall between a photocell pair. When no such boundary intervenes, the output signals from the two photocells are substantially the same even though there may be an intensity gradient across the discrete area in which the increment focused on the photocell pair is located. In that instance, the difference between the output signals from the two photocells becomes vanishingly small, and the corresponding difference circuit produces an output signal of zero, representing the log of the ratio of 1 to 1. Gradual illumination gradients tend to be ignored. When the image increments sensed by a pair of photocells straddle a boundary between discrete areas of differing brightness, the output signals from the two photocells are not equal. The difference circuit then produces a ratio signal of significant proportions representing some finite value equal to the log of the ratio of the two intensities sensed by the two photocells and thus corresponding to the ratio of light intensities on the opposite sides of the boundary.

Since the output from the difference circuit corresponding to a given pair of photocells is essentially zero when the increment focused on such pair of photocells lies within a discrete image area rather than on the boundary between discrete areas, the output from the summing circuit corresponding to each succeeding pair of photocells on which an increment within a bounded area is focused is the same as the output from the summing circuit corresponding to the preceding pair of photocells. Thus, the summing circuits corresponding to succeeding pairs of photocells sensing light from the same bounded area, all produce substantially the same output signal. This output signal equals the output signal of that summing circuit corresponding to the next preceding pair of photocells sensing light across the boundary between this same bounded image area and an adjacent bounded image area. Accordingly, the summing circuit corresponding to each pair of photocells sensing light from a boundary between discrete areas effectively multiplies the ratio of intensities across this boundary times the ratio represented by the output from the summing circuit corresponding to the next preceding photocell pair positioned to sense light from opposite sides of a boundary between discrete areas. Thus, the summing circuits multiply the ratios of intensities across the boundaries between discrete areas in the same manner that the ratios of intensities across the boundaries between panels are multiplied as described with reference to FIG. 1. The resulting output signals of the summing circuits represent the logarithm of the sequential products of the ratios of intensities across the boundaries between discrete areas. As pointed out with respect to FIG. 1, the sequential products resulting from this multiplication correspond closely to the relative lightnesses of the panels as would be perceived by a viewer. Accordingly, the outputs of the summing circuits corresponding to the photocell pairs sensing light across image boundaries correspond to the relative lightnesses of the discrete areas on a logarithmic scale. In this manner, the output or lightness signals of the analog system correctly represent the relative lightnesses of the corresponding increments of the image focused on the photocell array.

Preferably, the lamps of the lamp array produce output intensities proportional to the antilogarithm of the applied signal. Accordingly, each lamp produces light with an intensity corresponding closely to the relative lightness of the discrete area in which the corresponding increment is located in the image focused on the photocell array. In this manner, the relative lightness of the discrete areas of the image focused on the photocell array is represented in the reproduced image as brightness.

Since the brightness of each discrete area of an image reproduced by this system depends upon the lightness (not brightness) of the corresponding discrete areas in the image focused on the photocell array relative to some starting value which starts the sequence of multiplication of ratios, this starting value must be determined in order for all of the discrete areas in the reproduced image to have the correct relative brightnesses. In the system shown, a correct starting value is automatically determined within the matrix of the system because of two operating characteristics of the system: first, because the analog circuits are connected in a closed loop as described above and, second, because each of the summing circuits has an amplitude-limited maximum output signal. Each summing circuit is adjusted to energize its corresponding lamp with a predetermined maximum brightness when producing its maximum output signal. This maximum brightness becomes a standard by which the brightness of all other lamps in the array may be compared. In the reproduced image, this corresponds to the whitest or the lightest image area.

Figure 1:
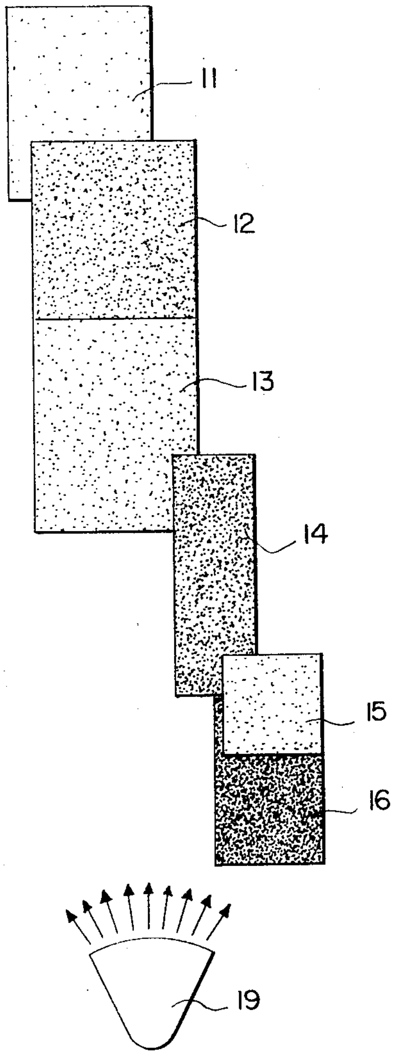
FIG. 1 is a pictorial representation of an experimental arrangement illustrating some of the principles on which the present invention is based.

For example, in the reproduction of an image such as that shown in FIG. 1, the lamp array would render image area 11 as the brightest portion of the image because it is, in the original subject, the lightest portion. If a change were made in the original subject, all of the lamps in the lamp array would readjust their intensities appropriately. For example, if image area 14 of comparatively low reflectance were replaced by a similar sized image area of higher reflectance than that of image area 11, the image reproduced by the lamp array would no longer show image area 11 as the brightest portion of the scene. In fact, the brightness of the lamps which would then define image area 11 would be reduced to a level less than that of reproduced image area 14. The reproduced image area 14 would then become the brightest portion of the image.

This bears closer analysis. When area 14 of the original subject is replaced by a new and lighter area, i.e., one having the highest reflectance of any of the image areas 11 through 16, the sequential multiplication of ratios which had previously been effected by the image reproduction system is interrupted. New values are substituted. Those portions of the image reproduction system which had previously attempted to reproduce image area 14 at a lightness value lower than that of image area 11 now attempt to exceed the brightness of image area 11. This cannot be done, however, because of the limitation on the amplitude of the output signal. In effect, the sequential multiplication of brightness ratios is interrupted and the multiplication begins anew with all successive multiplications being based upon the new maximum values derived by the system for image area 14. This interruption of the multiplication effected by the system occurs whenever the array derives a sequentially multiplied brightness ratio signal which tends to exceed the maximum output signal level of a summing circuit. At this point, the system substitutes the new maximum value and all subsequent multiplications of ratios are based on this maximum. The reproduced scale of lightnesses rendered in terms of the individual brightnesses of lamps in the array are scaled down from that maximum value. It is particularly to be observed and stressed that this system locates the lightest area of the original subject, not necessarily the brightest, and reproduces all image areas with brightnesses dependent on the scale of lightnesses of corresponding areas in the original subject.

Figure 4:
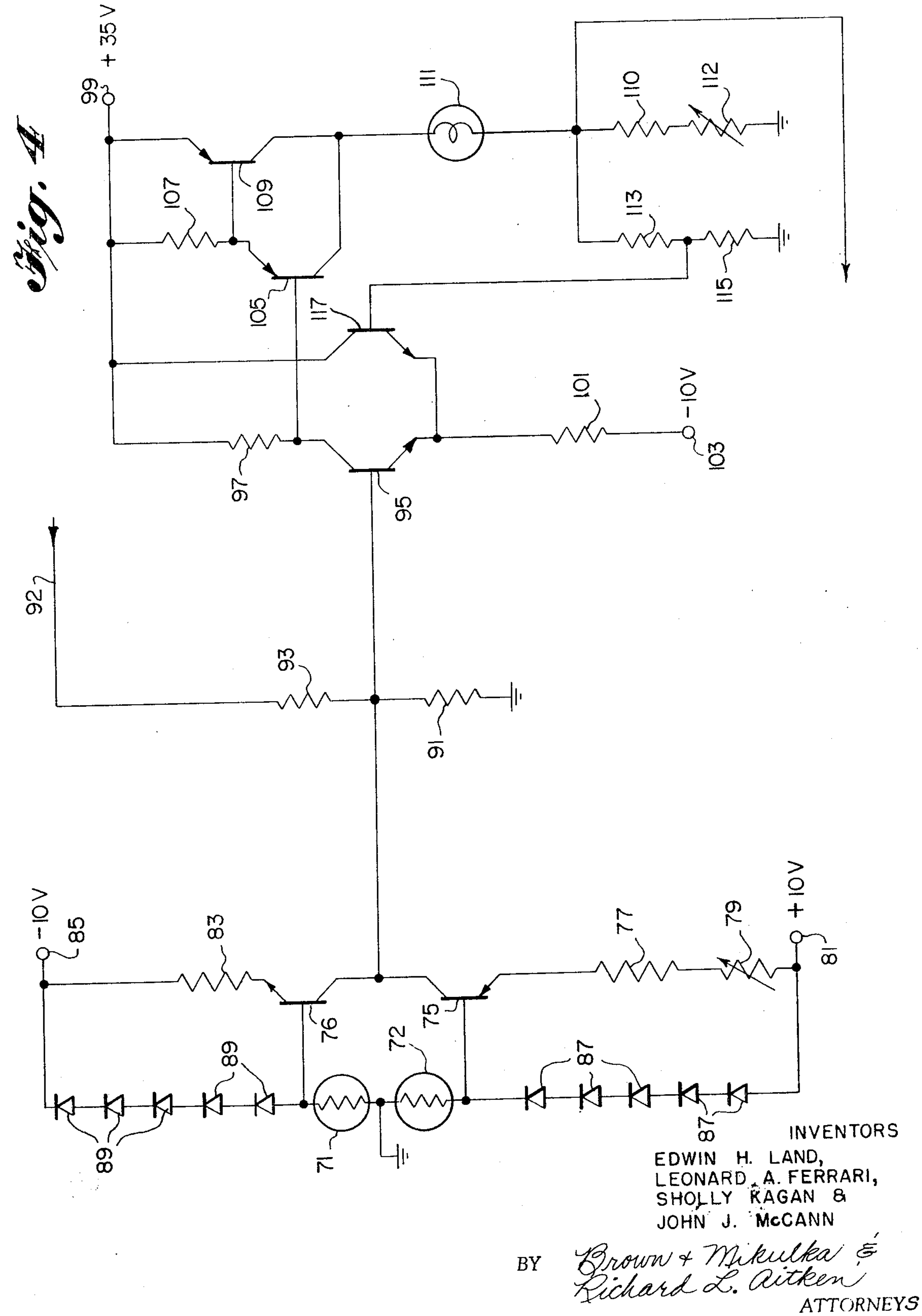
FIG. 4 is a circuit diagram illustrating the detailed circuitry of a portion of the system of the present invention.

FIG. 4 is a circuit diagram illustrating the details of the summing circuit and the difference circuit corresponding to a given pair of photocells. In FIG. 3, the photocells are designated by the reference numbers 71 and 72. Each of the photocells 71 and 72 has a resistance which is proportional to the intensity of the light incident thereon. One side of each of the photocells 71 and 72 is connected to ground. The other side of the photocell 72 is connected to the base of a PNP transistor 75, and the other side of the photocell 71 is connected to the base of a NPN transistor 76. The emitter of the transistor 75 is connected through a series circuit of a 2.7 kilohm resistor 77 and a variable 5 kilohm resistor 79 to a 10 volt positive DC source applied at a terminal 81. The emitter of the transistor 76 is connected through a 4.7 kilohm resistor 83 to a 10 volt negative source of DC voltage applied at a terminal 85. The terminal 81 is connected through five diodes 87 connected in series to the junction between the photocell 72 and the base of the transistor 75. The diodes 87 are poled to permit current to flow from the terminal 81 to photocell 72. The terminal 85 is connected through five diodes 89 connected in series to the junction between the photocell 71 and the base of the transistor 76. The diodes 89 are poled to permit current to flow from the photocell 71 to the terminal 85. The resistances of the photocells 71 and 72 change linearly with the intensity of the light incident thereon. Because the diodes 87 are connected in series with the photocell 72, the voltage at the base of the transistor 75 and accordingly the base current of the transistor 75 varies logarithmically with the intensity of the light incident on the photocell 72. Similarly, because of the diodes 89 connected in series with the photocell 71, the voltage applied to the base of the transistor 76 and accordingly the base current of the transistor 76 varies logarithmically with the intensity of the light incident on the photocell 71. The collectors of the transistors 75 and 76 are connected together and to ground through a 10 kilohm resistor 91. The collector currents of the transistors 75 and 76 are summed in the resistor 91. However, since the currents through the transistors 75 and 76 are of opposite polarity, the summing of the currents in the resistor 91 in effect is a subtraction so that the transistors 75 and 76 perform the function of a difference circuit such as the circuits 43, 47 and 51 described with reference to the block diagram of FIG. 3. The variable resistor 79 permits the difference circuit to be properly balanced.

The output signal from the summing circuit corresponding to the preceding pair of photocells is applied from an input 92 to the junction between the transistors 75 and 76 and the resistor 91 through a 10 kilohm resistor 93. The resistors 91 and 93 sum the output signal from the summing circuit corresponding to the preceding pair of photocells and the signal representing the logarithm of the ratio of the intensities incident upon the two photocells 71 and 72 so that a signal proportional to this sum is produced at the junction between the resistors 91 and 93. Accordingly, the signal at this junction is proportional to the sum of the output signal from the summing circuit corresponding to the preceding pair of photocells and the output signal of the difference circuit corresponding to the photocells 71 and 72. Thus, the resistors 91 and 93 comprise the summing circuit corresponding to the photocells 71 and 72.

The signal at the junction between the resistors 91 and 93 is applied to the base of a NPN transistor 95, the collector of which is connected through a 1 kilohm resistor 97 to a 35 volt positive source of DC voltage applied at a terminal 99 and the emitter of which is connected through a 2.2 kilohm resistor 101 to a 10 volt negative source of DC voltage applied at a terminal 103. The collector of the transistor 95 is connected to the base of a PNP transistor 105, the emitter of which is connected through a 100 ohm resistor 107 to the 35 volts applied at terminal 99. The collector of the transistor 105 is connected to the collector of a PNP transistor 109, the base of which is connected to the emitter of the transistor 105 and the emitter of which is connected directly to the terminal 99. The collectors of the transistors 105 and 109 are connected through a series circuit of a lamp 111, a 5 ohm resistor 110, and a 50 ohm variable resistor 112 to ground. The lamp 111 is the lamp in the lamp array corresponding to the pair of photocells 71 and 72.

Resistors 113 and 115, each having a resistance of 430 ohms, are connected in series from the junction between the lamp 111 and the resistor 110 to ground. The junction between the resistors 113 and 115 is connected to the base of a transistor 117, the emitter of which is connected to the emitter of the transistor 95 and the collector of which is connected to the terminal 99. The transistor 95, 105 and 109 amplify the signal voltage applied to the base of the transistor 95 to produce an output signal voltage across the lamp 111, proportional to the applied input signal and representing the sum of the output signal from the difference circuit comprising the transistors 75 and 76 and the output signal of the summing circuit corresponding to the preceding pair of photocells. The lamp 111 produces output light with an intensity proportional to the antilogarithm of the signal voltage applied to the base of the transistor 95. Accordingly, the intensity of the light produced by the lamp 111 corresponds to the relative lightness of the discrete area in which the increment focused on the photocell 72 is located. The resistor 112 provides a means for adjusting the brightness of the lamp 111 for a given input signal applied to the base of the transistor 95. The resistor is adjusted to give the desired intensity to represent white when the current through the transistor 109 is at its maximum.

The transistor 117 provides a feedback signal to the amplifier comprising the transistors 95, 105 and 109 to insure that the signal voltage produced at the junction between the lamp 111 and the resistor 110 is twice the signal voltage applied to the base of the transistor 95 for reasons explained below. The resistors 113 and 115 act as a voltage divider so that the signal voltage at the junction between the resistors 113 and 115 is half the voltage at the junction between the lamp 111 and the resistor 110. The transistors 95 and 117 are matched so that the voltage drop across the emitter base junctions of these two transistors is the same. Accordingly, the voltage at the bases of these two transistors should be the same. Any voltage difference between the bases of the transistors 95 and 117 is amplified by the transistors 95, 105, 109 and 117 to counteract such difference. In this manner, the voltage at the junction between the resistors 113 and 115 is maintained equal to that applied to the base of the transistor 95 and the voltage at the junction between the lamp 111 and the resistor 110 is maintained at twice the voltage applied to the base of the transistor 95. This signal voltage at the junction between the lamp 111 and the resistor 110 is the output of the summing circuit which is applied to the input of the summing circuit corresponding to the next succeeding pair of photocells in the photocell array. The reason this signal voltage is controlled to be twice that applied to the base of the transistor 95 is to compensate for the voltage divider effect on this signal voltage in the summing circuit corresponding to the next succeeding pair of photocells following the photocells 71 and 72. As pointed out above, the signal voltage from the summing circuit corresponding to the photocell pair preceding the photocells 71 and 72 is applied to the summing circuit corresponding to the photocells 71 and 72 from an input 92. The resistors 93 and 91 act as a voltage divider on this signal so that the summing circuit in effect adds half the signal voltage on the input 92 to the output signal of the difference circuit. For this reason, the signal applied to each summing circuit from the summing circuit corresponding to the preceding pair of photocells should be a scale of twice that of the output signals of the difference circuits. Accordingly, the signal voltage produced at the junction between the lamp 111 and the resistor 110 is maintained twice that applied to the base of the transistor 95.

The above described embodiment of the invention reproduces a monochromatic subject image. The inventive concept is not limited to black and white or monochromatic systems as it may also be used in two or three color systems. In a color system, duplicate photocell arrays might be used to sense different color components of the subject image to be reproduced. For example, a red filter could be placed in front of the photocell array of one circuit and a green filter in front of the photocell array of the other circuit. Corresponding lamp arrays producing registered images in appropriate colors would be excited by signals from the respective signal processing systems.

Instead of using photocells which have resistances which vary linearly with the intensity of the light incident thereon, photodiodes which produce output signals proportional to the logarithm of the intensity of the applied signal could be used, thus eliminating the need for the conversion of the linear resistance variation to a logarithmic scale. These and many other modifications may be made to the above described specific embodiment of the invention without departing from the spirit and scope of the invention, which is defined in the appended claims.

We claim:

1. An image sensing system comprising:
an array of photocells adapted to have an image focused thereon,
means interconnecting said photocells in a regular sequence to produce ratio signals representing brightness ratios between adjacent image increments focused on pairs of adjacent photocells in said array, and
means responsive to said ratio signals to produce a lightness signal corresponding to each of said image increments and representing the sequential product of each brightness ratio determined for a given photocell pair and the brightness ratios determined for the preceding photocells pairs in said sequence.

2. An image sensing system comprising an array of photocells adapted to have an image focused thereon, said photocells being connected in pairs to sense light from adjacent increments of such image, and analog means responsive to the output signals of said photocells to produce lightness-characterizing signals for each of said increments and representing the product that results from the multiplication of the ratio of light intensities at any given pair of adjacent image increments times the sequential product of the ratios of light intensities at pairs of adjacent image increments preceding said given pair of increments in said sequence.

3. An image sensing system comprising an array of photocells adapted to have an image focused thereon, said photocells being connected in sequential pairs to sense light from adjacent increments of said image, and analog means responsive to the output signals of said photocells to produce an output signal for each one of said increments and representing a ratio between the light intensity at said one image increment and the light intensity at an adjacent image increment multiplied by the ratios between light intensities at pairs of adjacent image increments preceding said one increment in said array.

4. An image sensing system comprising an array of photocells arranged in a regular sequence and adapted to have an image focused on said array of photocells, pairs of said photocells being arranged to sense light from adjacent increments of the image focused on said array, each pair sensing light from image increments adjacent to the increments sensed by a preceding pair of photocells in said sequence, and analog means responsive to the output signals of the photocells of said array to produce an output signal corresponding to each increment of said image representing the product that results from the multiplication of the ratio between the intensities sensed by a given pair of said photocells times the sequential product of the ratios between the intensities sensed by the preceding photocell pairs in said sequence.

5. An image reproduction system comprising an image sensing system as recited in claim 4 and output means responsive to the output signals of said analog means to produce an image in accordance with the output signals of said analog means to thereby reproduce the image focused on said array of photocells.

6. An image reproducing system as recited in claim 5 wherein said output means comprises a lamp array including a lamp for each of said pairs of photocells connected to be energized to produce an output intensity in accordance with the product represented by the corresponding output signal of said analog means, each lamp of said array being located in a position in said lamp array corresponding to the position of a respective image increment impinging on said photocell array.

7. An image sensing system as recited in claim 4 wherein there is provided means to produce a logarithmic signal corresponding to each photocell and representing the logarithm of the intensity of the light focused on such photocell and wherein said analog means includes means to subtract the logarithmic signal corresponding to one of the photocells of each of said pairs from the other and to add the resulting difference to the output signal of the analog means corresponding to the preceding pair of photocells to provide said output signal corresponding to each pair of photocells.

8. An image reproduction system comprising an image sensing system as recited in claim 7 and a lamp array including a lamp for each pair of photocells connected to be energized in accordance with the corresponding output signal of said analog means, each lamp producing light of an intensity proportional to the antilogarithm of the energizing signal, each lamp of said array being located in a position in said lamp array corresponding to the position of a respective image increment focused on said photocell array.

9. An image reproduction system as recited in claim 7 wherein each of said photocells has a resistance proportional to the intensity of the light focused thereon and wherein said means to provide a logarithmic signal corresponding to each of said photocells comprises a circuit including a plurality of diodes connected in series with said photocell.

10. An image sensing system comprising an array of photocells and arranged in a sequence of succeeding pairs and adapted to have an image focused on said array, each of said pairs being arranged to sense light from adjacent increments of the image focused on said array, each pair of photocells sensing light from increments adjacent to the increments sensed by the preceding pair of photocells in said sequence, and analog means responsive to the output signals of said photocells to produce an output for each of said photocell pairs representing a lightness ratio determined by the ratio between the intensities sensed by the photocells of such pair multiplied by the sequential products of the ratios represented by the output signals of said analog means corresponding to all preceding photocell pairs in said sequence.

11. An image reproduction system comprising an image sensing system as recited in claim 10 and means responsive to the output signals of said analog means to produce an image in accordance with said output signals to thereby reproduce the image focused on said array of photocells.

12. An image reproduction system as recited in claim 11 wherein said output means comprises a lamp array including a lamp for each of said pairs of photocells connected to be energized to produce light with an intensity proportional to the ratio represented by the corresponding output signal of said analog means, each lamp of said array being located in a position in said lamp array corresponding to the position of a respective image increment focused on said photocell array.

13. An image sensing system as recited in claim 10 wherein the increment of said image focused on the last photocell in said sequence is adjacent to the increment of said image focused on the first photocell and wherein the ratio represented by the output signal corresponding to the first pair of photocells is determined by multiplying the ratio of intensities sensed by the photocells of said first pair times the ratio represented by the output signal of the analog means corresponding to the last pair of photocells in said sequence.

14. An image sensing system as recited in claim 10 wherein there is provided means to produce a logarithmic signal corresponding to each of said photocells representing the logarithm of the intensity of the light focused on such photocell and wherein said analog means comprises means to subtract the logarithmic signals corresponding to one photocell of each pair from the other and to add the resulting difference to the output signal of the analog means corresponding to the preceding pair of photocells to thereby produce said output signal corresponding to each pair of photocells.

15. An image reproduction system comprising an image sensing system as recited in claim 14 and a lamp array including a lamp for each pair of photocells in said photocell array connected to be energized in accordance with a corresponding output signal of said analog means, each lamp producing an output intensity proportional to the antilogarithm of the energizing signal.

16. An image sensing system comprising an array of photocells arranged in a predetermined sequence and adapted to have an imagewise distribution of light focused thereon, means for obtaining from adjacent pairs of said photocells in said array signals representing the ratio of brightness sensed by said photocells at closely adjacent points at separate increments of said distribution, analog means responsive to said signals representing brightness ratios to produce signals representing the brightness ratios sensed by each of said adjacent pairs of said photocells multiplied times the sequential product of all brightness ratios sensed by said photocells preceding such adjacent pair in a predetermined sequence to establish a hierarchical scale of lightness values of said increments, said analog means including means responsive to the establishment of a lightness value at any particular one of said increments more extreme than at any preceding one of said increments for interrupting the sequence of multiplication at said particular increment and for starting a new sequence of multiplication of successive brightness ratios detected by said array at said particular increment.

17. An image reproduction system comprising an image sensing system as recited in claim 16 wherein said analog means produces an output signal representing each sequential product determined by said multiplying means in said multiplication sequence, and output means responsive to the resulting output signals to produce an image in accordance with the output signals of said analog means to thereby reproduce said imagewise distribution of light focused on said array of photocells.

18. An image reproducing system as recited in claim 17 wherein said output means comprises a lamp array including a lamp for each of said output signals and means to energize each of said lamps to produce light of an intensity in accordance with the sequential product represented by the corresponding output signal.

19. An image sensing system as recited in claim 17 wherein said means for interrupting said sequence of multiplication carries out said interruption of the sequence of multiplication by providing each sequential product in said sequence of multiplication with a predetermined maximum value.

* * * * *